United States Patent
Corey et al.

(10) Patent No.: US 7,093,483 B2
(45) Date of Patent: Aug. 22, 2006

(54) DIFFERENTIAL PRESSURE WIND METER

(76) Inventors: Francis Scott Corey, 12655 Long Green Pike, Hydes, MD (US) 21082; Ben Lane, 19 Glenbrook Dr., Phoenix, MD (US) 21131

( * ) Notice: Subject to any disclaimer, the term of this patent is extended or adjusted under 35 U.S.C. 154(b) by 0 days.

(21) Appl. No.: 10/848,533

(22) Filed: May 18, 2004

(65) Prior Publication Data

US 2005/0005695 A1    Jan. 13, 2005

Related U.S. Application Data

(60) Provisional application No. 60/471,394, filed on May 19, 2003.

(51) Int. Cl.
    *G01P 5/00* (2006.01)
(52) U.S. Cl. .................................. 73/170.14
(58) Field of Classification Search ................. 73/1.57, 73/170.14, 861.66, 204.22, 170.06, 170.11, 73/170.15
    See application file for complete search history.

(56) References Cited

U.S. PATENT DOCUMENTS

| | | | | |
|---|---|---|---|---|
| 2,934,950 A | * | 5/1960 | Harrison | 73/170.11 |
| 4,920,808 A | * | 5/1990 | Sommer | 73/861.42 |
| 5,357,795 A | * | 10/1994 | Djorup | 73/170.12 |
| 5,515,735 A | * | 5/1996 | Sarihan | 73/861.47 |
| 6,237,426 B1 | * | 5/2001 | Gryc et al. | 73/861.66 |
| 6,244,114 B1 | * | 6/2001 | Kowal et al. | 73/861.26 |
| 6,279,393 B1 | * | 8/2001 | McLaughlin | 73/170.14 |
| 6,487,918 B1 | * | 12/2002 | DeAngelis | 73/861.66 |
| 6,684,174 B1 | * | 12/2002 | DeAngelis | 702/138 |
| 2003/0172746 A1 | * | 9/2003 | Walker et al. | 73/861.65 |

* cited by examiner

*Primary Examiner*—Edward Lefkowitz
*Assistant Examiner*—George P. Bonanto
(74) *Attorney, Agent, or Firm*—Ober/Kaler c/o Royal W. Craig

(57) ABSTRACT

A wind meter comprising a plurality of micro-electro-mechanical (MEM) differential pressure sensors positioned in a lobed housing, with an even number of circumferential ports arranged in an equally-spaced, circular pattern at the distal ends of the lobes of the housing, with tubes leading inward from the ports to the MEM sensors. The MEM sensors and other control system electronics are contained in the housing and are fully enclosed therein. The lobed housing structure does not impede or influence the movement of the wind as it passes and yet serves to prevent the ingress of moisture into the housing, thereby preventing fouling of the sensors. The tubular structures include an internal coating of hydrophobic material and are oriented at a slight angle from the horizontal in order to accomplish this protection. The openings at the ends of the tubular structures are positioned outside the fluid boundary layer.

20 Claims, 7 Drawing Sheets

DIFFERENTIAL PRESSURE WIND METER

CROSS-REFERENCE TO RELATED APPLICATIONS

The present application derives priority from U.S. Provisional Patent Application Ser. No. 60/471,394 filed May 19, 2003.

BACKGROUND OF THE INVENTION

1. Field of the invention

The present invention relates to devices for fluid flow measurement and, more particularly, to apparatus for determining wind speed/velocity and direction utilizing a plurality of MEMS differential pressure sensors.

2. Description of the Background

There are many existing devices that attempt to determine the direction and velocity of wind. The various approaches taken to date have met with varying degrees of success. While such devices may incorporate any one of a variety of sensing technologies, they may be generally categorized as follows:

(1) Rotating, mechanical devices that typically have either a set of three cups or a propeller that rotates at a speed proportional to the wind velocity. The rotation of the cups/propeller is then converted to electrical signals either in the form of pulses or a voltage. However, due to the mechanical nature of such devices, light wind conditions might not overcome the frictional component of the device. The result may be an increasingly incorrect and sluggish response to quickly changing conditions. Furthermore, the device can easily fail in severe weather conditions such as icing or snow.

(2) Acoustic or Doppler anemometers. These devices measure the speed or frequency of a pressure pulse and rely on the variation in the speed of sound as a function of wind speed. While they can measure the wind velocity in all three dimensions simultaneously, they are expensive, sensitive to environmental shock (e.g. loud noises such as gun shots), and extremely sensitive to the effects of ice accumulation.

(3) Hot-wire anemometers. These devices operate on the principle that wind passing over a heated wire will cool that wire by an amount that is proportional to wind velocity. As the wind speed increases, increased current flow is needed to maintain the wire at a given temperature. In and of themselves these devices are incapable of measuring wind direction, and they generally result in excessive power consumption.

(4) Differential pressure sensors such as pitot or pressure tubes. In these devices, the differential between upstream and downstream pressures is measured by a differential pressure transducer. Generally, the pressure differential is quite small, as is the resulting output signal.

U.S. Pat. Nos. 4,920,808 to Sommer and 6,279,393 to McLaughlin provide examples of this fourth family of devices.

U.S. Pat. No. 4,920,808 to Sommer describes a rotationally symmetrical flow body probe with at least two sets of peripherally spaced openings in regions of different thickness along the side of the body. The velocity of flow along the body is determined by differences in the static pressure measured in the openings. Static pressures are measured at two longitudinally different positions on a flow body of varying thickness and their difference is determined, or the difference between these static pressures is measured directly. A first measuring position is located at or near the thickest portion of the flow body and the other measuring position is located at a thinner position of the flow body positioned either upstream or downstream. The fluid flow velocity is then calculated mathematically. The types of sensors are not specified.

U.S. Pat. No. 6,279,393 to McLaughlin discloses a system for measuring wind direction and velocity utilizing a sphere which is capable of making differential orthogonal pressure measurements using pressure sensors located inside the sphere along apertures forming orthogonal axes of the sphere. The pressure differentials are measured at multiple ports of the sphere and are used to determine differential pressure magnitude vectors. The preferred embodiment applies the Bernoulli principle to determine wind velocity and direction. An alternative embodiment applies Reynold's principle by using a sphere, having no apertures therein, with mechanical sensors mounted on its surface.

The advent of solid state micro sensor technology, or "MEMS" also presents an opportunity for more effective and economical fluid flow measurement. MEMS pressure sensors have been used to measure the shear stress of the wind, and a MEMS- hot wire anemometer has been attempted. In addition, U.S. Pat. No. 5,515,735, to Sarihan, entitled Micromachined Flow Sensor Device Using A Pressure Difference And Method of Manufacturing The Same, describes a micromachined flow sensor using a pressure differential through a channel. This device is related to Venturi-type devices, and such a device must be placed directly in the fluid flow and cannot measure wind direction.

Unfortunately, none of the foregoing prior art patents suggest a MEMS-based differential pressure sensing technology capable of measuring both wind velocity and direction. Moreover, the prior art does not provide for the protection of the sensors by any means that will not impede/influence the movement of the wind as its passes the sensors. Protection of the sensors in this manner would prevent their fouling, thereby extending the reliability and useful life of the device. Consequently, it would be greatly advantageous to provide a wind pressure and direction measuring apparatus that: (1) includes angled, outwardly extending tubular ports with openings positioned outside of the fluid boundary layer and a hydrophobic material coating its internal surfaces; (2) incorporates a multi-lobed overhead cover/roof structure that does not impede/influence the movement of the wind as its passes the apparatus; (3) utilizes a wind velocity correction algorithm to correct for variations in ambient air density due to fluctuations in temperature, pressure, and/or humidity; (4) prevents ice accumulation via the use of strategically located heating elements; (5) significantly improves the utility of such apparatus via the geometry of its housing; (6) has no moving parts to be affected by extreme environments; (7) possesses a simple, yet scalable, design fabricated of durable, lightweight materials/devices; and (8) may be economically manufactured and sold to provide for widespread use.

SUMMARY OF THE INVENTION

It is, therefore, the primary object of the present invention to provide an improved differential pressure wind measuring apparatus.

Another object of the present invention is to provide an improved apparatus that provides an instantaneous measurement of wind velocity.

A further object of the present invention is to provide an improved apparatus that provides an instantaneous measurement of wind direction.

Another object of the present invention is to provide an improved apparatus that possesses angled, outwardly extending ports to prevent sensor fouling.

It is another object of the present invention to provide an improved apparatus with port openings possessing a coating of hydrophobic material on its internal surfaces.

Still another object of the present invention is to provide an improved apparatus with port openings positioned outside of the fluid boundary layer.

A further object of the present invention is to provide an improved apparatus that prevents ice accumulation via the use of strategically located heating elements.

Yet another object of the present invention is to provide an improved apparatus that possesses a multi-lobed overhead cover/roof structure that does not impede/influence the movement of the wind as its passes the apparatus, and yet which protects an array of internal sensors.

Still another object of the present invention is to provide an improved wind velocity and direction measuring apparatus that utilizes a wind velocity correction algorithm to correct for variations in ambient air density due to fluctuations in temperature, pressure, and/or humidity.

Another object of the present invention is to provide an improved wind velocity and direction measuring apparatus that includes no moving parts, and which possesses a simple and scalable design which can be fabricated of lightweight inexpensive materials and devices which provide a commensurate degree of economy, durability and longevity.

According to the present invention, the above-described and other objects are accomplished by a wind meter comprising a plurality of micro-electro-mechanical (MEM) differential pressure sensors positioned in an even number of circumferential ports arranged in an equally-spaced, circular pattern on the exterior of a housing. The MEM sensors and other control system electronics are contained in the housing that is equipped with a cover/roof structure. The control system may utilize a wind velocity correction algorithm to correct for variations in ambient air density due to fluctuations in temperature, pressure, and/or humidity. The multi-lobed overhead cover/roof structure is configured and positioned above the ports such that it does not impede/influence the movement of the wind as it passes the present invention. The cover/roof structure also serves to prevent the ingress of moisture into the housing. A plurality of heating elements may be strategically located throughout the present invention to prevent ice accumulation. A plurality of tubular structures extend outwardly from the ports/MEM sensors to prevent any fouling of the sensors. The tubular structures include an internal coating of hydrophobic material and are oriented at a slight angle from the horizontal in order to accomplish this protection. The openings at the ends of the tubular structures are positioned outside the fluid boundary layer. The present invention contains no moving parts due to its entirely solid state construction. The present invention is fabricated of lightweight materials/devices chosen to provide an appropriate degree of durability/longevity. The present invention possesses a simple, yet scalable, design that may be economically manufactured and sold to provide for widespread use.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
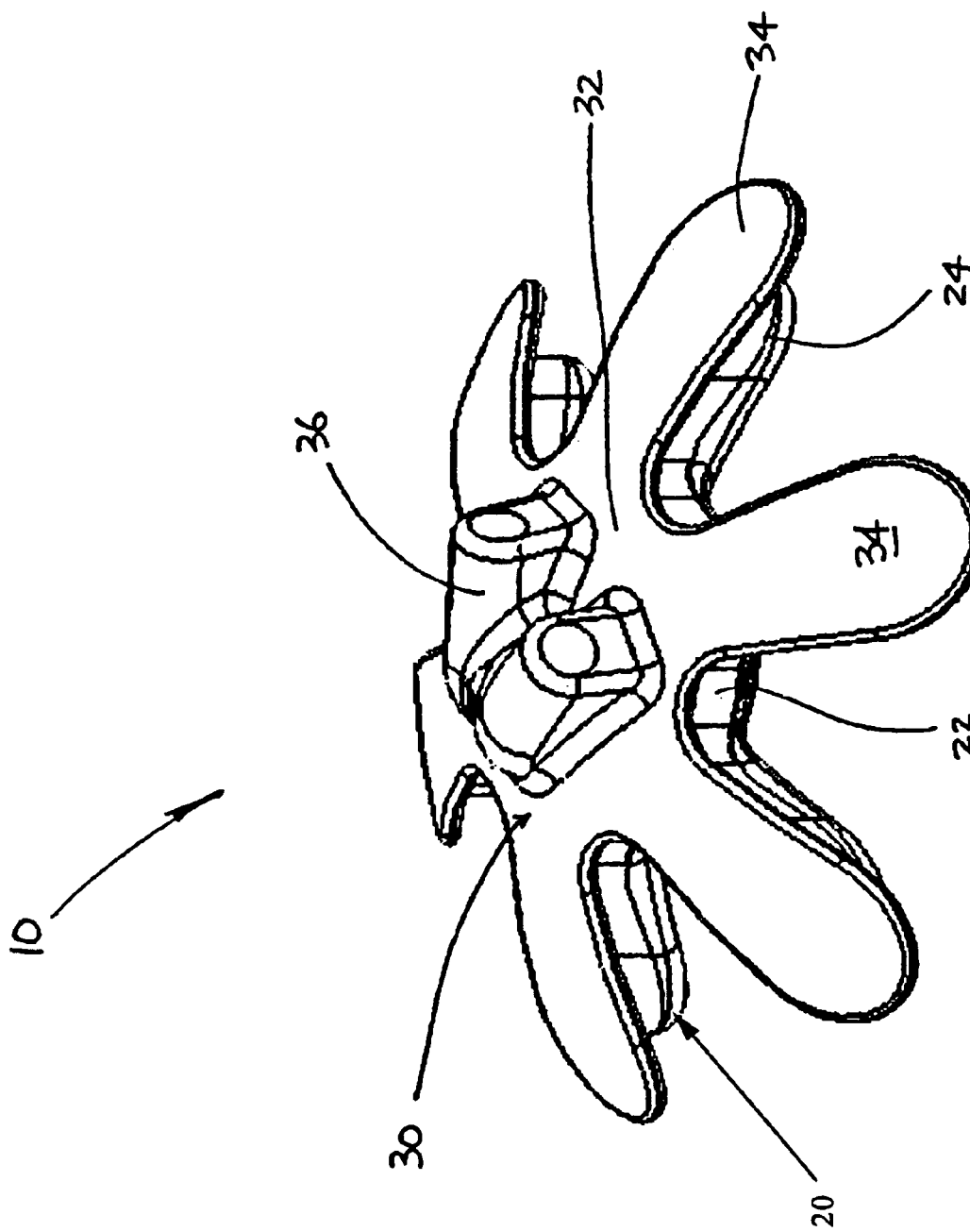
FIG. 1 is a top perspective view of a wind meter 10 according a preferred embodiment of the present invention.
Figure 2:
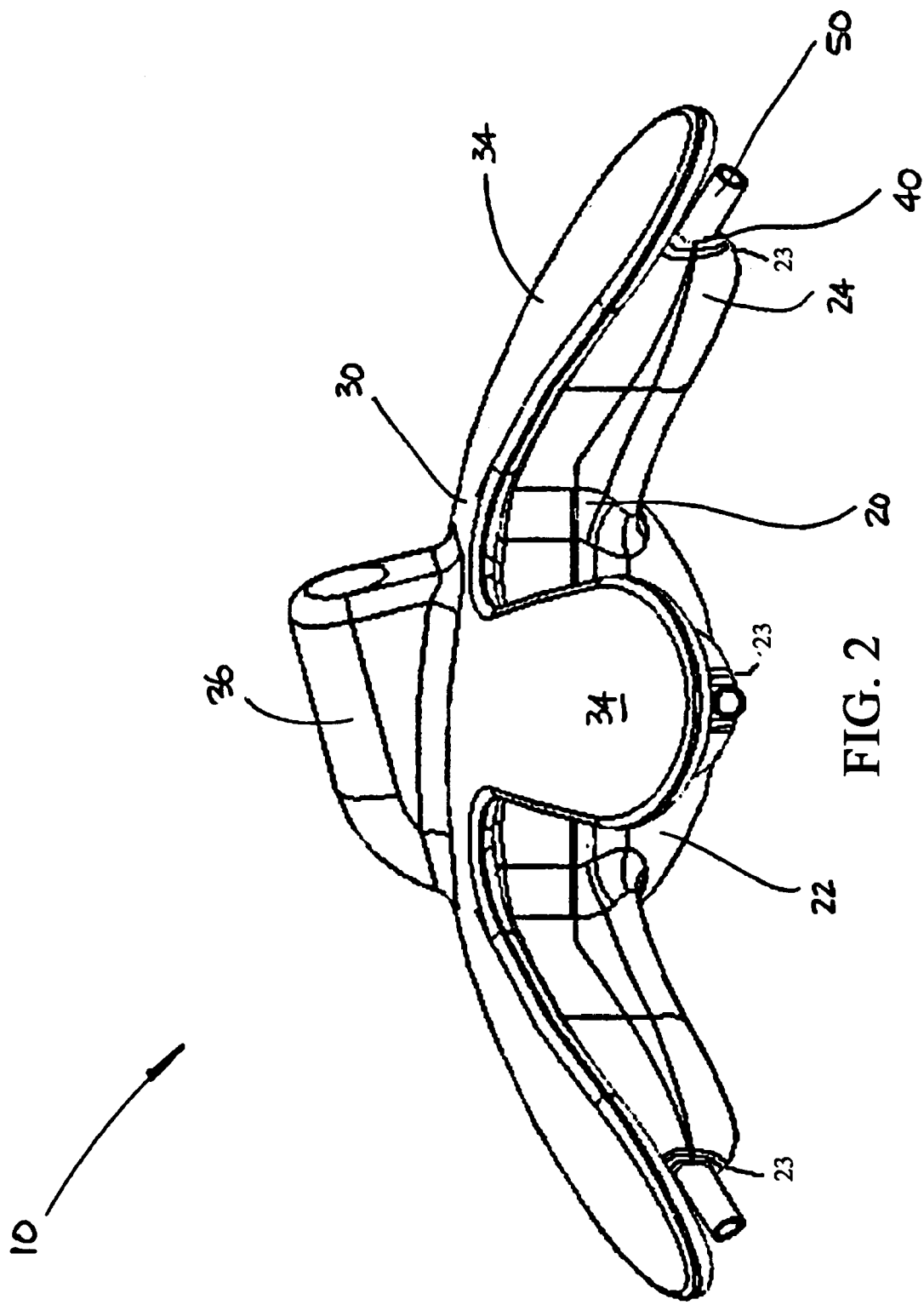
FIG. 2 is a side perspective view of the wind meter 10 of FIG. 1.
Figure 3:
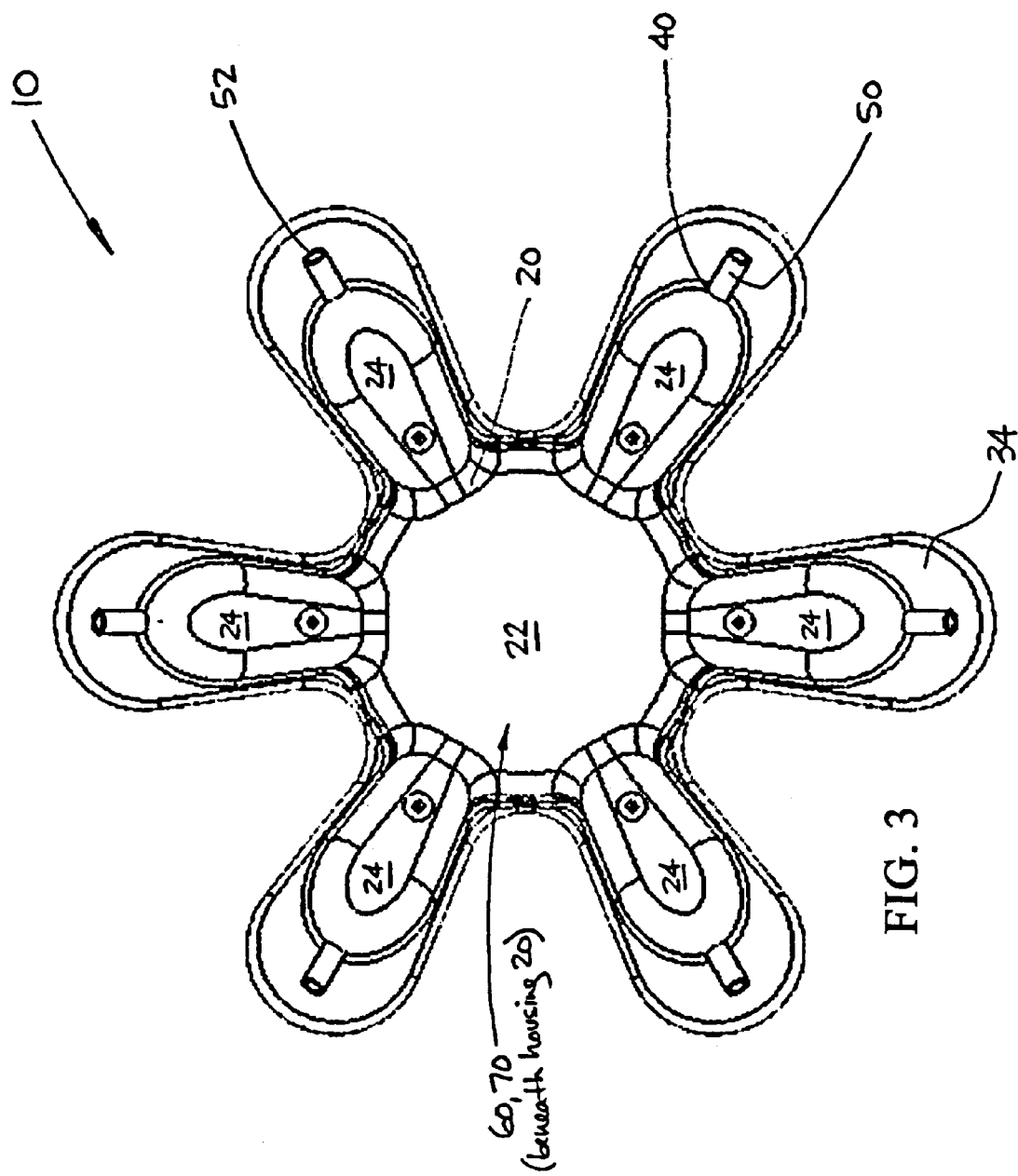
FIG. 3 is a bottom perspective view of the wind meter 10 of FIGS. 1 and 2.

FIGS. 1–3 are, respectively, top, side, and bottom perspective views of a wind meter 10 according to a preferred embodiment of the present invention. The wind meter 10 preferably comprises a housing 20, a cover/roof structure 30, a plurality of ports 40, a plurality of tubular structures 50, a plurality of MEM differential pressure sensors 60, and a control system 70.

The housing 20 generally comprises a central section 22 formed with an even number of outwardly extending lobes 24. The central section 22 and lobes 24 are preferably fabricated as a unitary component from a commercially available, injection moldable plastic such as injected PVC, ABS or polycarbonate. However, any strong, lightweight material, such as other plastic material or metal (e.g. aluminum) will suffice, so long as it can be formed into the shape of the housing 20 of the present invention.

The cover/roof structure 30 is preferably fixedly attached to the housing 20 and generally comprises a central section 32, a corresponding number of outwardly extending lobes 34, and two mounting receptacles 36. The number of cover/roof lobes 34 is equivalent to the number of housing lobes 24. The central section 32, lobes 34, and mounting receptacles 36 are likewise fabricated as a unitized component, for example, from commercially available, injection moldable plastic as above, of like materials.

As best seen in FIG. 2, a plurality of optional heating elements 23 may be strategically located at the ends of the outwardly extending lobes 24 of the central section 22 of housing 20, or elsewhere throughout the present invention (e.g. positioned within the tube structures 50, or the lobes 34 of the cover/roof structure 30) to prevent ice accumulation.

Referring in combination to FIGS. 2 and 3, a number of ports 40 are. formed in the external surface of the housing 20, each port 40 opening from the end of a corresponding lobes 24. A hollow tube 50 enters each port 40, each tube 50 extending outward a short distance beyond the mouth of its associated port 40 and terminating beneath the protective cover of the overhead cover/roof lobe 34. Each tube 50 forms a channel connecting an internal MEMs sensor 60 (see detailed discussion below) with the environment external to the wind meter 10. The tubes 50 are preferably fabricated from a commercially available, extrusion-moldable plastic such as PVC, and each is fixedly attached in a corresponding lobe 24 such that all tubes 50 are oriented in a spoke-like manner at a slight downward angle from horizontal. The slight downward angle assists the tubes 50 in accomplishing their primary purpose of protecting the MEM sensors 60 from fouling due to, for example, the ingress of moisture which gravity will run out. Moreover, the internal surfaces of the tubular structures 50 are preferably coated with a conventional hydrophobic material (such as a silicon copolymer) to further prevent the ingress of moisture. The external tips of the tubes 50 form an equally-spaced, circular pattern.

Figure 4:
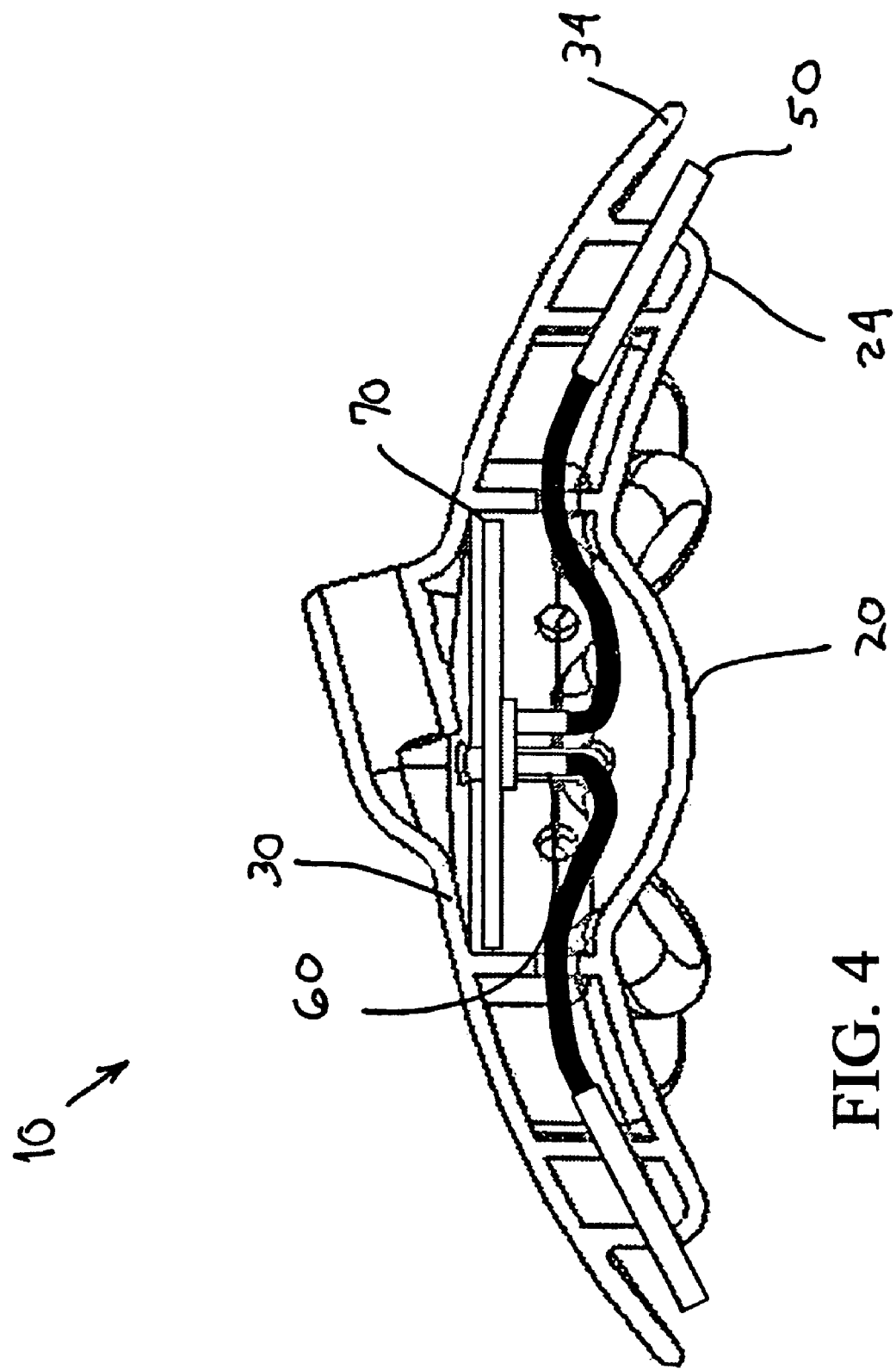
FIG. 4 is a side cross-sectional view of the wind meter 10 of FIGS. 1–3.

As can be seen in FIG. 4, positioned at the internal end of each tubular structure 50 is a MEMs differential pressure sensor 60. Each MEM sensor 60 is preferably a commercially available unit such as those available from Silicon Microstructures, Inc. as part number SM5812.

Figure 5:
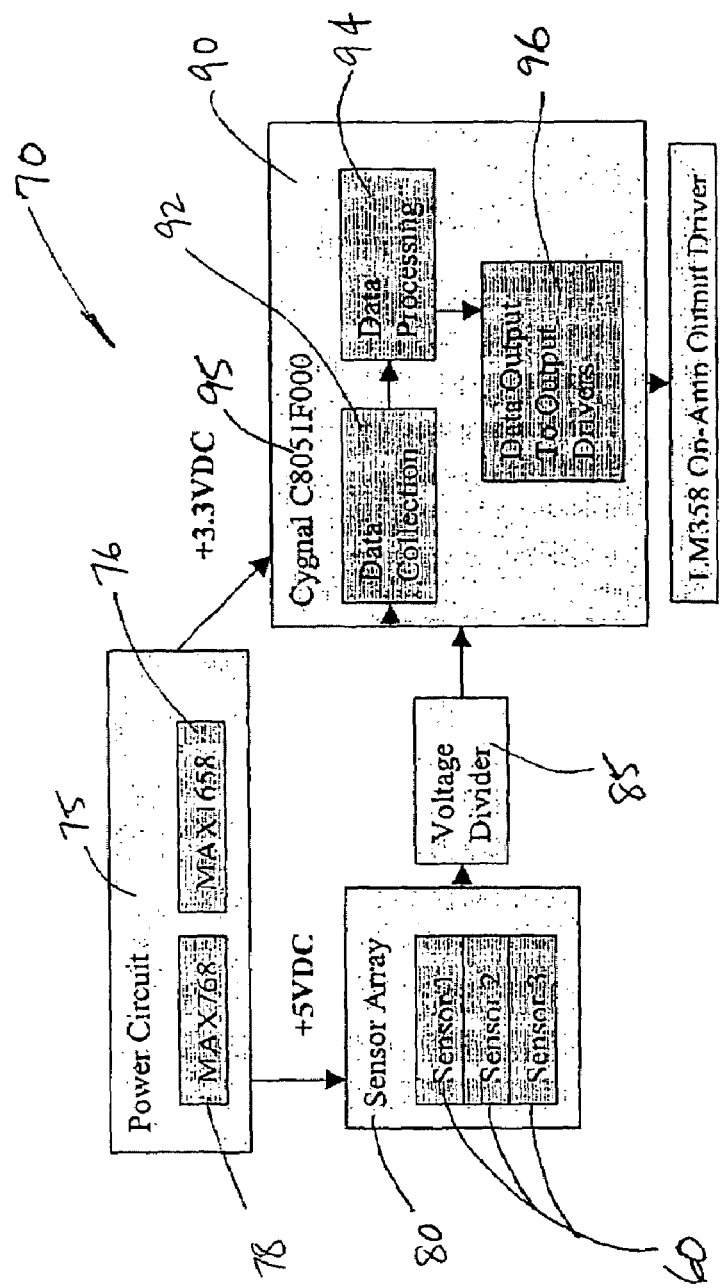
FIG. 5 is a schematic representation of the control system 70.

An on-board microcontroller-based control system 70 is located within the cavity formed by the housing 20 and the cover/roof structure 30. The control system 70 utilizes a wind velocity correction algorithm to correct for variations in ambient air density due to fluctuations in temperature, pressure, and/or humidity. A schematic representation of the control system 70 is shown in FIG. 5. The control system 70 comprises a power circuit 75, a sensor array 80, and a data processing subsystem 90. The power circuit 75 preferably comprises a 3.3 VDC voltage regulator 76, such as is commercially available from Maxim Integrated Products of Sunnyvale, Calif. (part number MAX1658), with a +5 VDC voltage pump 78 also commercially available from Maxim (part number MAX768). The primary duty of the power circuit 75 is to provide a very stable power source for the sensor array 75 and the data processing system 90. Voltage ripple from the pump 78 must be less than 0.2% or 0.01 volts.

The sensor array 80 comprises three MEMS-based differential pressure sensors 60 that provide differential air pressure information to the data acquisition subsystem 92. The input to the sensor array 80 is the differential pressure measured at the tip 52 of each tube 50 on the wind meter 10. The sensors 60 require a high-precision voltage source to prevent noisy or erroneous pressure readings. Each pressure sensor 60 uses an on-board ASIC (application specific integrated circuit) to collect pressure readings from a MEMS diaphragm, thereby providing a stable temperature-compensated reading. The Laboratoire d'Electronique et de Technologie d'Instrumentation (LETI) of the Commission d'Energie Atomique (CEA) in France has developed a variety of MEMs-based pressure sensors that are well-suited. One such device uses micromachined silicon-on-insulator (SOI) wafers and multi-wafer bonding with piezoresistive silicon gauges insulated from the substrate to detect pressure changes. The device measures approx. 6 mm×6 mm and achieves good linearity (0.01%) without temperature compensation from 0 to 2 Bars and over an extended temperature range of −20 to 160 degrees centigrade. Another device is surface micromachined into SOI wafers. It uses epitaxial silicon on insulator substrates as starting material. It uses deep reactive ion etching (DRIE) and the buried oxide layer serves as the sacrificial release layer. In this case pressure changes are measured capacitively. The device measures 1 mm×1 mm and operates from 0 to 1 Bar with a sensitivity of 3 pF/Bar over a temperature range of −40 to 125 degrees centigrade. Depending on the MEMs approach, an associated ASIC is provided (these are readily designed using conventional ASIC design software) to collect pressure readings from the particular MEMS diaphragm.

The data processing system 90 comprises a data acquisition subsystem 92, a data processing subsystem 94, and a data reporting/posting subsystem 96 which respectively acquire sensor data, process the acquired data, and report the results in several different output formats.

More specifically, the data acquisition subsystem 92 receives high speed data samples from the pressure sensors 60. The data acquisition subsystem 92 comprises a commercially-available voltage divider 85 that feeds the divided input voltage from each sensor 60 to the data processing subsystem 94. The data processing subsystem 94 is currently implemented with a commercially-available Cygnal C8051F000 8051-based mixed signal microcontroller 95 with support circuitry including analog-to-digital converters (ADCs). The voltage divider 85 feeds the divided input voltage from each sensor 60 to the analog-to-digital converter (ADC) internal to the microcontroller 95. Each input to the ADC is polled at a rate of 50 kHz for short periods of time in order to obtain the maximum possible number of measurements in the shortest period of time. This provides for a high degree of signal averaging, yielding an effective 16-bits of ADC resolution from a 12-bit ADC core.

The data processing subsystem 94 applies mathematical models to the differential pressure information supplied by the data acquisition subsystem 92. The input to the subsystem 94 is the digital data supplied by the data acquisition subsystem 92, the output is the calculated wind velocity at the tip 52 of each tube 50, the overall estimated wind velocity, and relative and absolute wind direction. Additionally, all averaged differential pressure readings at each tip 52 are stored in the microcontroller's flash memory and used to correct for any bias error.

The data reporting/posting subsystem 96 takes the output data of the data processing subsystem 94 and makes it available to an end-user. Three data formats are available; RS232, NEMA0183, or pulse frequency modulated output.

Given either of the conditioned and calibrated outputs (12-bit digital word or ratiometric analog voltage), the wind velocity from the differential pressure $\Delta P_i$ as measured by the MEMS sensors 60 is readily calculated as follows:

$$V = C \cdot \sqrt{\sum_{i=1}^{N} \Delta P_i^2}$$

Where:
V=wind velocity
C=calibration constant
$\Delta P_i$=differential pressure i
N=number of sensors The calibration constant is a function of the density of the ambient air which, in turn, is a function of ambient temperature, pressure, and humidity. To optimize the accuracy of the wind meter 10, the ambient temperature, pressure, and humidity are measured by the present invention and incorporated into the calibration constant.

Wind direction may also be determined using the differential pressure measurements. Each differential pressure, $\Delta P_j$, is normalized as:

$$\overline{\Delta P_j} = \frac{\Delta P_j}{\sqrt{\sum_{i=1}^{N} \Delta P_i^2}}$$

The normalized differential pressure for each sensor 60, as a function of wind direction, must be characterized through laboratory testing because it varies with the specific geometry of the device (i.e. six ports 40/sensors 60, eight ports 40/sensors 60, etc.). The characterization function is roughly sinusoidal and, therefore, more than a single differential pressure measurement is necessary to uniquely determine the wind direction. The present invention uniquely and accurately determines wind direction based on two or more, normalized differential pressure measurements in combination with the lab characterization function.

Figure 6:
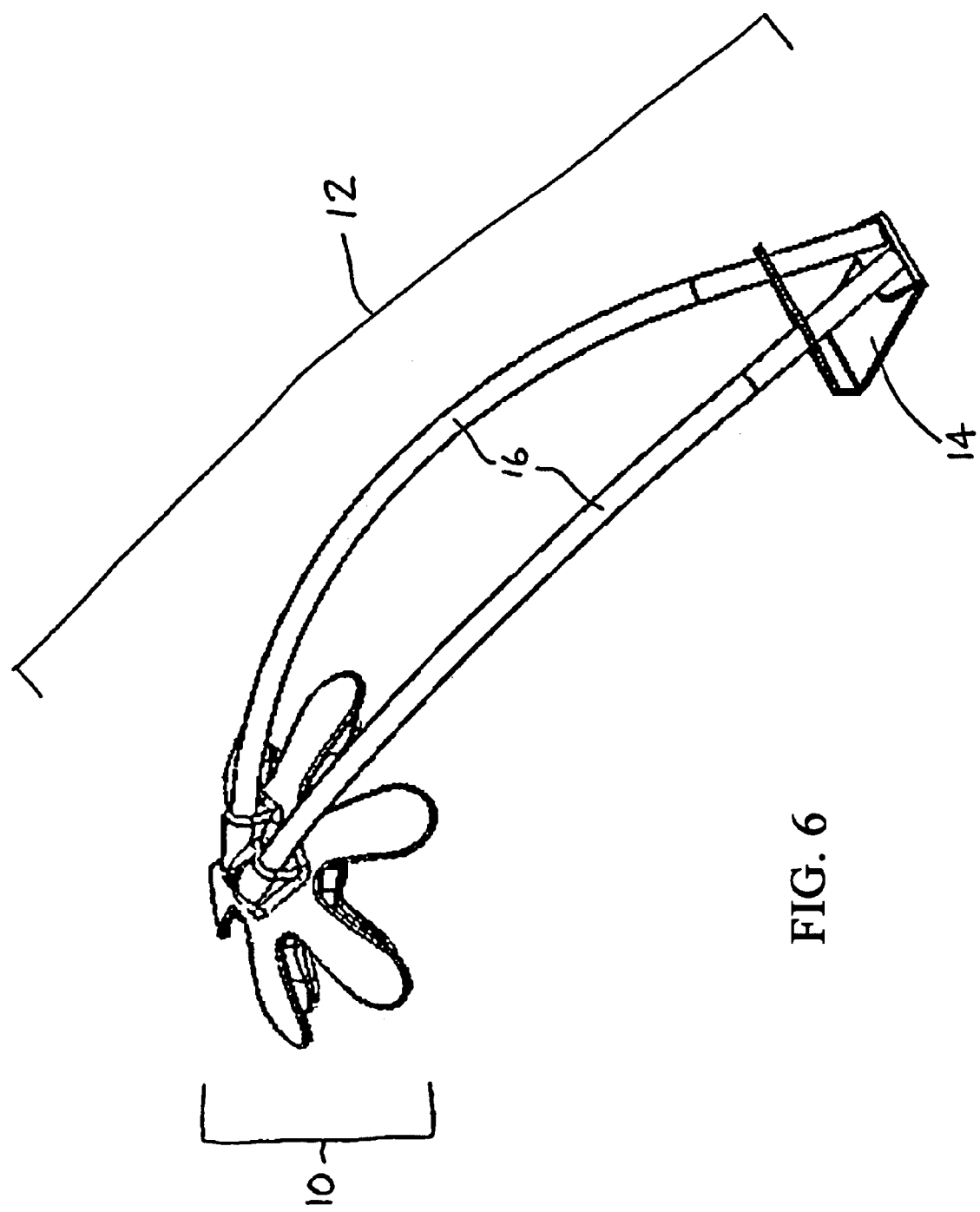
FIG. 6 is a side perspective view of the wind meter 10 of FIGS. 1–4 shown attached to a support structure 12.

In order to mount the wind meter 10, as shown in FIG. 6, the device is held in its operating position by a support structure 12. The support structure 12 generally comprises a mounting bracket 14 and one or more mounting poles 16. Typically, the mounting bracket 14 is fixedly attached to a rigid surface (e.g. the masthead of a ship, exterior wall of a building, etc.) before one end of each pole 16 is detachably attached to the bracket 14. The wind meter 10 is then detachably attached at the opposite end of each mounting pole 16 by inserting that end into a mounting tube 36 located on the cover/roof structure 30. As mentioned above, all control circuit wires pass through the tubes 16 to connect the wind meter 10 to a power source or other remote monitoring system(s)/device(s).

The mounting bracket 14 is preferably fabricated as a unitized component from a commercially available, material such as aluminum. However, any strong, lightweight material, such as molded plastic is equally suitable. The mounting poles 16 typically possess a circular cross-section and are likewise fabricated of plastic or aluminum tubular stock.

The present invention provides an accurate and reliable means for determining wind velocity and direction. The multi-lobed overhead cover/roof structure 30 positioned above the ports 40 and tubes 50 does not impede/influence the movement of the wind as it passes the wind meter 10. The cover/roof structure 30 also, in addition to the downward angle of the tubes 50, serves to prevent the ingress of moisture into the housing 20 and MEM sensors 60. The present invention is fabricated of strong, lightweight materials/devices chosen to provide an appropriate degree of durability/longevity. Its solid state construction (i.e. no moving parts) only serves to add to its durability/longevity. The present invention possesses a simple, yet scalable, design that may be economically manufactured and sold to provide for widespread use.

An important aspect of the present invention is that the tips 52 of the tubes 50 effectively position the ports 40 at points that are outside the fluid boundary layer. A fluid boundary layer results from air flow next to the fixed surface of housing 20 and cover/roof structure 30 where friction slows down the air molecules close to that surface. Thus, a measurement of the speed of the air right at those surfaces will yield a velocity near zero. However, further out from the surfaces the air speed will reach its free stream velocity. Additionally, if the ports 40 were positioned on the surface of the housing 20, the measured pressure would be a function of the location of boundary layer separation. This would make it very difficult to accurately derive wind direction because the location of boundary layer separation on a body/surface is very sensitive to surface roughness/irregularities (which may vary over time) as well as free stream wind velocity. As stated above, the tips 52 of the tubes 50 effectively position the ports 40 at points that are outside the fluid boundary layer away from the external surface of the housing 20 and cover/roof structure 30 in the free stream of air flowing past the wind meter 10. This avoids difficulty with boundary layer separation. Moreover, it allows the present invention to measure larger differential pressures than would be detected if the ports 40 (or the tips 52 of the tubes 50) were located right at the surface of the housing 20. This serves to make the wind meter 10 more sensitive in low wind velocity conditions. Finally, the sensitivity of the wind meter 10 is optimized by a plurality of heating elements strategically located throughout its structure intended to prevent ice accumulation.

Figure 7:
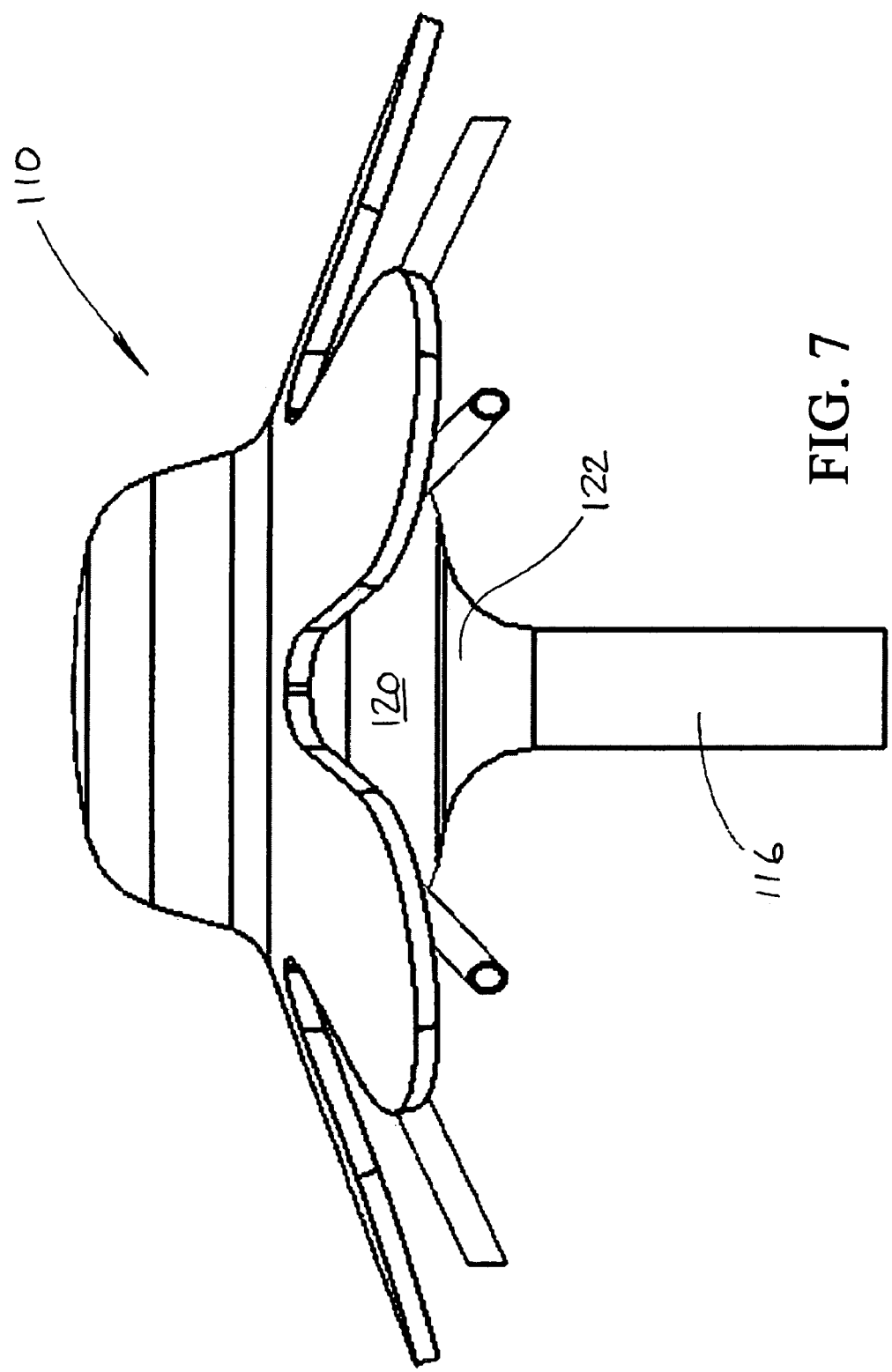
FIG. 7 is a side perspective view of a wind meter 110 according an alternative embodiment of the present invention.

Alternative embodiments of the present invention may be supported by a single mounting pole 16 running between a mounting bracket 14 and a single mounting tube 36 on the cover/roof structure 30, or, as shown with regard to wind meter embodiment 110 in FIG. 7, a single mounting pole 116 connected beneath the central section 122 of the housing 120.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A wind meter, comprising:
   a housing formed with a central section and a plurality of radially-protruding lobes extended outward from said central section, each of said lobes having a distal port formed therein;
   a plurality of tubes corresponding in number to said lobes, each individual tube extending outwardly through a corresponding one of said ports;
   a plurality of pressure sensors mounted within said housing each proximate one end of a corresponding tube; and
   a control system mounted within said housing and electrically coupled to all of said pressure sensors.

2. The wind meter according to claim 1, wherein said plurality of tubes are angled at a downward angle from horizontal to prevent fouling of said plurality of sensors.

3. The wind meter according to claim 1, wherein said housing is formed with an even number of lobes.

4. The wind meter according to claim 1, wherein said plurality of pressure sensors comprise MEMs sensors.

5. The wind meter according to claim 4, wherein said plurality of MEMS pressure sensors comprise differential pressure sensors.

6. The wind meter according to claim 1, wherein said housing further comprises a two-part enclosure including a lower section with said plurality of radially-protruding lobes, and an upper cover overlying each of said lobes to providing overhead shelter.

7. The wind meter according to claim 1, wherein said control system further comprises a data acquisition subsystem, a data processing subsystem, and a data reporting subsystem which respectively acquire data from said sensors, process the acquired data, and report the processed data in a variety of output formats.

8. The wind meter according to claim 7, wherein said data acquisition subsystem comprises a voltage divider connected to the data processing subsystem.

9. The wind meter according to claim 7, wherein said data processing subsystem comprises a microcontroller with support circuitry including analog-to-digital converters.

10. The wind meter according to claim 1, wherein said control system is entirely solid state.

11. A wind meter, comprising:
a housing formed with a central section and a plurality of radially-protruding lobes extended outward from said central section, each of said lobes having a distal port formed therein;
a cover structure fixedly attached to said housing, said cover having a corresponding number of lobes each covering a port of said housing;
a plurality of tubes corresponding in number to said lobes, each tube being fixedly attached in said housing and extending outwardly through a corresponding one of said ports, one tube per port, and terminating beneath a lobe of said cover;
a plurality of sensors mounted within said housing each proximate an end of a corresponding tube; and
a control system located in a cavity formed by said housing and said cover and electrically coupled to all of said sensors.

12. The wind meter according to claim 11, wherein said plurality of tubes are angled to prevent fouling of said plurality of sensors.

13. The wind meter according to claim 11, wherein said housing and said cover are formed with an even number of lobes.

14. The wind meter according to claim 11, wherein said plurality of pressure sensors comprise MEMs sensors.

15. The wind meter according to claim 14, wherein said plurality of MEMS pressure sensors comprise differential pressure sensors.

16. The wind meter according to claim 11, wherein said housing further comprises two-part enclosure including a lower section with said plurality of radially-protruding lobes, and an upper cover overlying each of said lobes to providing overhead shelter.

17. The wind meter according to claim 11, wherein said control system further comprises a data acquisition subsystem, a data processing subsystem, and a data reporting subsystem which respectively acquire data from said sensors, process the acquired data, and report the processed data in a variety of output formats.

18. The wind meter according to claim 17, wherein said data acquisition subsystem comprises a voltage divider connected to the data processing subsystem.

19. The wind meter according to claim 17, wherein said data processing subsystem comprises a microcontroller with support circuitry including analog-jo-digital converters.

20. The wind meter according to claim 11, wherein said control system is entirely solid state.

* * * * *